United States Patent [19]

Nance

[11] Patent Number: 5,548,517
[45] Date of Patent: Aug. 20, 1996

[54] AIRCRAFT WEIGHT AND CENTER OF GRAVITY INDICATOR

[76] Inventor: C. Kirk Nance, P.O. Box 120605, Arlington, Tex. 76012

[21] Appl. No.: 113,286

[22] Filed: Aug. 27, 1993

Related U.S. Application Data

[63] Continuation-in-part of Ser. No. 884,638, May 15, 1992, abandoned, which is a continuation-in-part of Ser. No. 832,470, Feb. 7, 1992, Pat. No. 5,214,586.

[51] Int. Cl.$^6$ .................................................. G01L 19/04
[52] U.S. Cl. ..................... 364/463; 364/571.03; 73/708; 73/178 T
[58] Field of Search .................................... 364/463, 567, 364/571.03, 558, 557; 73/708, 178 T

[56] References Cited

U.S. PATENT DOCUMENTS

| | | | |
|---|---|---|---|
| 3,513,300 | 5/1970 | Elfenbein et al. | 235/150.2 |
| 3,584,503 | 6/1971 | Senour | 73/65 |
| 3,701,279 | 10/1972 | Harris et al. | 73/65 |
| 3,900,828 | 8/1975 | Lage et al. | 340/27 |
| 4,110,605 | 8/1978 | Miller | 364/463 |
| 4,225,926 | 9/1980 | Wendt | 364/463 |
| 4,446,524 | 5/1984 | Wendt | 364/463 |
| 4,490,802 | 12/1984 | Miller | 364/567 |
| 4,502,555 | 3/1985 | Gower | 177/25 |
| 4,607,530 | 8/1986 | Chow | 73/708 |
| 4,651,292 | 3/1987 | Jeenicke et al. | 364/571 |
| 4,715,003 | 12/1987 | Keller et al. | 364/571 |
| 4,796,212 | 1/1989 | Kitagawa | 364/571 |
| 4,866,640 | 12/1989 | Morrison, Jr. | 364/558 |
| 4,935,885 | 6/1990 | McHale et al. | 364/567 |
| 5,117,687 | 6/1992 | Gerardi | 73/170 R |

OTHER PUBLICATIONS

*Pressue and Strain Measurement Handbook and Encyclopedia*, Omega Engineering, Inc. 1984, pp. A9–A16.

*Primary Examiner*—Vincent N. Trans
*Attorney, Agent, or Firm*—Geoffrey A. Mantooth

[57] ABSTRACT

An onboard system for use in measuring, computing and displaying the gross weight and location/relocation of the center of gravity, for aircraft. Temperature and pressure transducers are mounted in relation to each of the landing gear struts. Transmit those temperature and pressure signals to an onboard microcomputer/controller with redundancy for accuracy and failure protection. The system also incorporates a software correction program, along with attached hardware, to correct and compensate for physical changes to strut components due to temperature fluctuations, seal drag and hysteresis within modern day "shock absorbing" aircraft landing gear struts. The computer makes adjustments for internal temperature changes and drag; converts sustained pressures to the weight supported by each strut, and computes the aircrafts current gross weight and center of gravity. The computer is also programmed to illuminate a "Hard Landing Indicator Light" mounted on the display, when pre-programmed individual strut pressure limits are exceeded and sensed during landing. These pressure readings are stored in the computer memory and can be utilized when the aircraft is inspected and serviced.

29 Claims, 7 Drawing Sheets

AIRCRAFT WEIGHT AND CENTER OF GRAVITY INDICATOR

This application is a continuation-in-part application of pending U.S. Patent application Ser. No. 07/884,638, filed May 15, 1992, now abandoned, which application is a continuation-in-part of U.S. patent application Ser. No. 07/832,470, filed Feb. 7, 1992, now U.S. Pat. No. 5,214,586.

BACKGROUND OF THE INVENTION

Two critical factors in the flight of any aircraft or airplane are the weight and balance of that aircraft or airplane. An airplane manufacturer must determine and publish the maximum operating weight of that airplane. This is to insure that at take-off speed, the wings are generating sufficient lift to lift the weight of the airplane. A second but equally important factor to consider is whether the airplane is in balance (optimum location for the center of gravity) or within acceptable limits, as can be compensated for by trim adjustments. Calculations to determine weight and center of gravity in terms of percent MAC (Mean Aerodynamic Chord) are well known and well documented. Reference may be made to U.S. Pat. No. 3,513,300 to Elfenbein.

Prior art methods to determine weight and center of gravity are performed using measurements of some portions of the aircraft's payload and estimates of the remaining portions of the aircraft's payload. This information is input into ground computers which calculate weight and center of gravity. The calculations are relayed to the pilot in the aircraft before take-off.

This invention relates to improvements to the previous so-called "Weight and Center of Gravity Indicators". The lack of those systems being utilized by the major air carriers, reinforces the position that those systems are not accurate nor reliable on today's modern aircraft landing gear. Today's aircraft landing gear struts incorporate the shock absorbing technique of forcing hydraulic fluid through a small orifice hole within the strut cylinder. Compressed nitrogen gas is used to retard foaming of the hydraulic fluid as it passes through this orifice. Multiple O-ring seals and a gland nut around the piston are used to retain the hydraulic fluid and compressed nitrogen gas contained within each strut cylinder. The retention of the compressed nitrogen gas and hydraulic fluid by the O-ring seals is due to the extreme amount of friction these seals maintain as they move up and down the interior strut cylinder walls. This friction causes substantial drag to this up and down movement. While this may improve the shock absorbing quality of the strut, IT DISTORTS INTERNAL PRESSURES WITHIN THE LANDING GEAR STRUT AS THOSE PRESSURES RELATE TO THE AMOUNT OF WEIGHT THE STRUT IS SUPPORTING.

In the present invention, temperature, drag and hysteresis compensation values are used to correct for the distorted pressure readings caused by drag within the landing gear struts. This produces more accurate weight and center-of-gravity measurements of an aircraft.

The airline industry may not wish to give up the methods for estimating weights, that they have been using for years. This new system could then complement their current practices by giving the pilots a verification, of data received from the ground computers, that one or more of the input figures to the ground computer, were not entered in error or possibly that some numbers have not been transposed. The decision whether or not to attempt a take-off, ultimately is made by the pilot in command. This new system will give more accurate information, which can be used to make that decision.

Fuel costs are a major concern to the airline industry. Frequently airplanes are held at the gate prior to departure, waiting for estimated weight and center of gravity calculations to be determined and transmitted from the ground computers to the pilots. Often those figures are delayed or if they come back beyond the airplanes limits, adjustments must be made at the gate. This new system progressively calculates those figures as the airplane is being loaded, giving those total figures to the pilots as the airplane doors are being closed. These real time weight and center-of-gravity measurements would allow the airplane to immediately leave the gate, thus saving fuel industry wide.

Cost effectiveness is another major concern of the airline companies; getting the most revenue from each flight that an airplane makes. With the current system of estimating weight, the airline companies must factor in margins for error in their calculations, which can result in unnecessary empty seats or less cargo transported. This new system, which more accurately determines the airplane weight, could reduce those margin amounts and allow more income producing cargo to be transported on each flight.

Still another application of this new system could be the general aviation industry (the private and corporate pilots). These pilots do not have the sophisticated weight and balance computers, used by the airline companies, at their disposal. These pilots must weigh each and every item loaded on to their airplanes, or as many pilots do, just estimate or guess at it. This new system will provide for these pilots the same benefits as discussed for the airline pilots.

SUMMARY OF THE INVENTION

It is one object of the present invention to provide a new and improved airplane weight and center of gravity indicator which utilizes pressurized landing gear struts. These struts maintain pressure by O-ring seal friction along interior strut cylinder walls. The weight supported by each strut is related to the amount of pressure contained within the strut. Distortion of these pressure readings occur from temperature changes and its effects on compressed nitrogen gas, along with the drag caused by O-ring seal friction, gland nut friction, internal guide bearing friction, external scissor-link friction and friction due to other sources such as damaged components. This invention provides more accurate measurements and calculations. New software correction programs are incorporated, along with an optional and attachable hardware package to make compensations to the pressure readings for the distortions incurred by drag and hysteresis, to obtain a more accurate weight determination.

Another object of this invention is to provide a new and improved airplane weight and center of gravity indicator which performs a unique daily self-check verification of the pressure and temperature transducers, and the onboard microcomputer with slave controllers, for failures or false measurements. Each day when the airplane is removed from service and standing at rest, the invention is turned off. Temperature, drag and hysteresis corrected pressure readings, as they relate to the weight they are supporting, are stored within the computer memory. The next day, as the airplane is brought back into service, while the airplane is still at rest, the invention is turned back on displaying both the previous calculations as they compare to current calculations. The matching of these totals insure the repeatability and reliability of the new invention.

Yet another object of this invention is the provision of a new and improved onboard weight and center of gravity indicator which includes (optional) electronically controlled valves which will be open while the microcomputer/controller makes a sequence of pressure and temperature measurements. One purpose of these valves is to protect the transducers and to provide a safety measure against strut pressure loss in the event of a transducer failure or burst.

One other object of this invention is to provide a unique "Hard Landing Indicator" system utilizing preprogrammed pressure limits stored in the computer memory which will illuminate a warning signal on the cockpit display, when those pressure limits are exceeded during a hard landing.

The present invention provides an apparatus for determining the weight of an aircraft. The aircraft includes plural pressurized landing gear struts, with the landing gear struts experiencing friction/drag. The apparatus includes a pressure sensor for each landing gear strut and a processor means for determining the aircraft weight. The processor means is connected to the pressure sensors. The processor means determines the aircraft weight using pressure measurements from the pressure sensors using compensations and adjustments in determining weights supported by the respective landing gear struts for distortion caused by strut friction/drag.

The method of the present invention determines the weight of an aircraft. The aircraft is supported by plural pressurized landing gear struts. The method determines the amount of pressure within the respective landing gear struts. The weight supported by each of the landing gear struts is determined from the respective pressure determinations. The respective weight determination of each landing gear strut is compensated for distortions caused by strut friction/drag. Then, the weight of the aircraft is determined from the respective compensated weight determinations.

In one aspect of the present invention, the compensation of strut friction/drag includes determining friction/drag by measuring the friction/drag of each strut. Friction/drag of a strut can be measured by changing the amount of fluid (hydraulic fluid or nitrogen gas) within the strut so as to either extend or compress the strut, with the strut being subjected to a constant weight. Fiction/drag is then determined from the change in pressure measurements.

In another aspect of the present invention, friction/drag is compensated for by using a stored value of friction/drag (whether measured or otherwise provided) and compensating the pressure measurement of each strut by the friction/drag value.

BRIEF DESCRIPTION OF THE DRAWINGS

Although the features of this invention, which are considered to be novel, are expressed in the appended claims; further details as to preferred practices and as to the further objects and features thereof may be most readily comprehended through reference to the following description when taken in connection with the accompanying drawings, wherein:

DETAILED DESCRIPTION OF THE PREFERRED EMBODIMENT

Figure 1:
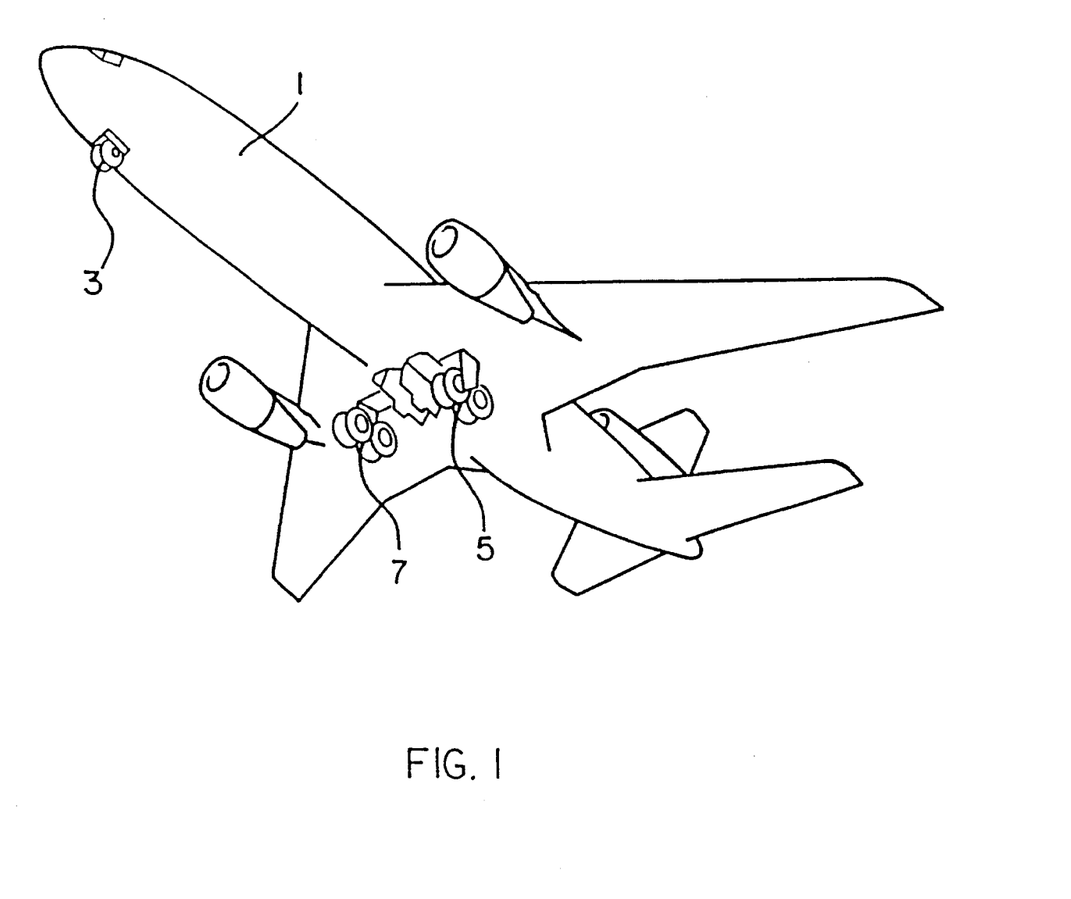
FIG. 1 is a view of the lower side of a typical commercial airliner with a tricycle type landing gear, in the extended position.

Referring now to the drawings, wherein like reference numerals designate corresponding parts throughout the several views and more particularly to FIG. 1 thereof, is a typical commercial airliner 1 with a tricycle landing gear configuration consisting of a nose landing gear 3, port main landing gear 5 and starboard main landing gear 7.

Figure 2:
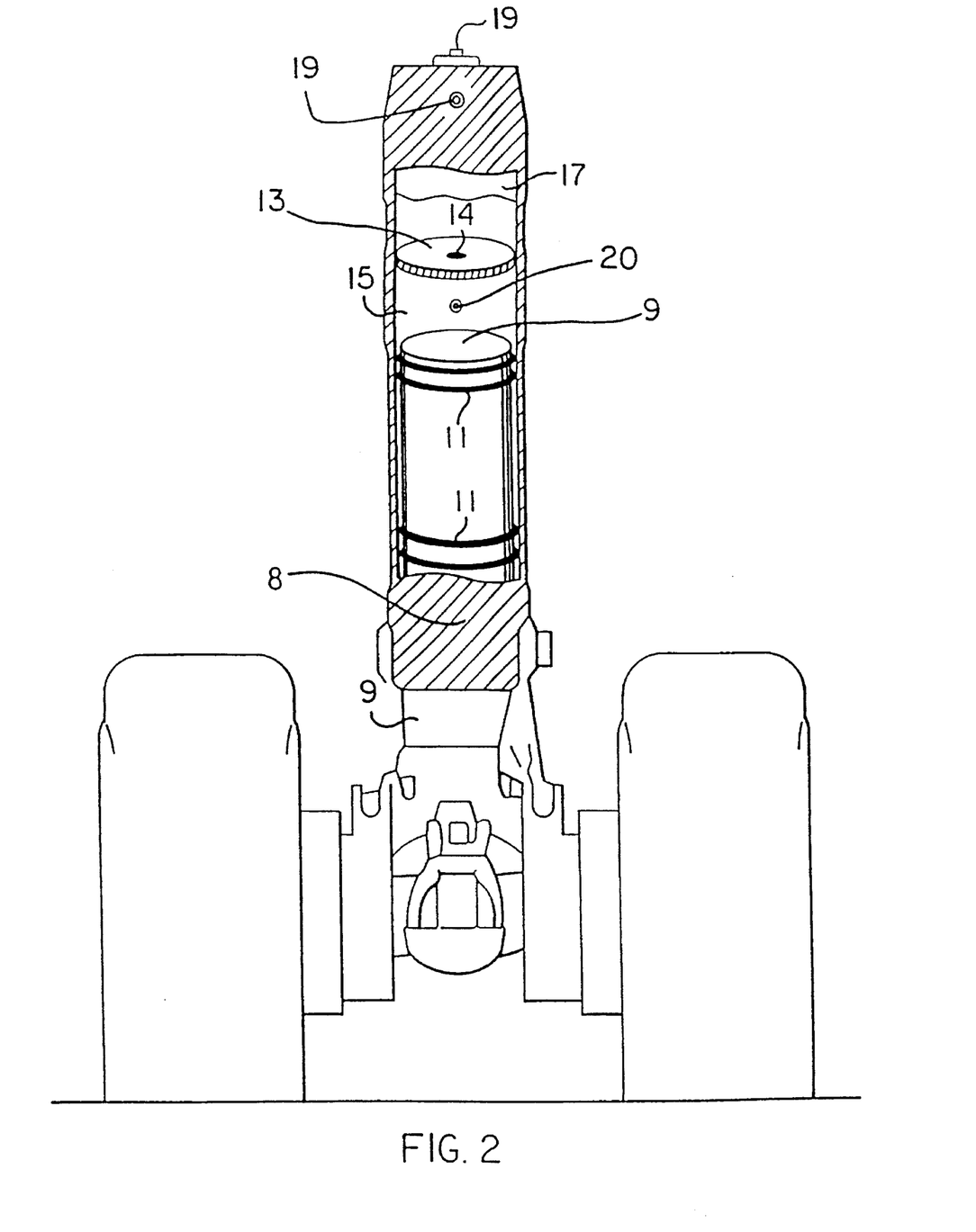
FIG. 2 is a partial cross-sectional view of a typical commercial airliner landing gear strut, with enclosed piston, O-ring seals and orifice plate.

Referring now to FIG. 2, wherein each landing gear which are always exposed to extreme temperature, whether extended or retracted, consists of one oleo-type shock strut 8, of which together support the weight of the airplane on a nitrogen gas and hydraulic fluid cushion, which also absorb landing shock. Internally each shock strut contains a forged steel piston 9, with an orifice plate 13 containing an orifice hole 14 that dampens the strut compression motion. O-ring seals 11 serve to retain the hydraulic fluid 15 and compressed nitrogen gas 17 inside the strut cylinder. The pressure within the landing gear strut 8 can be measured externally through the charging valve fitting 20, or pressurization valve fitting 19.

Figure 3:
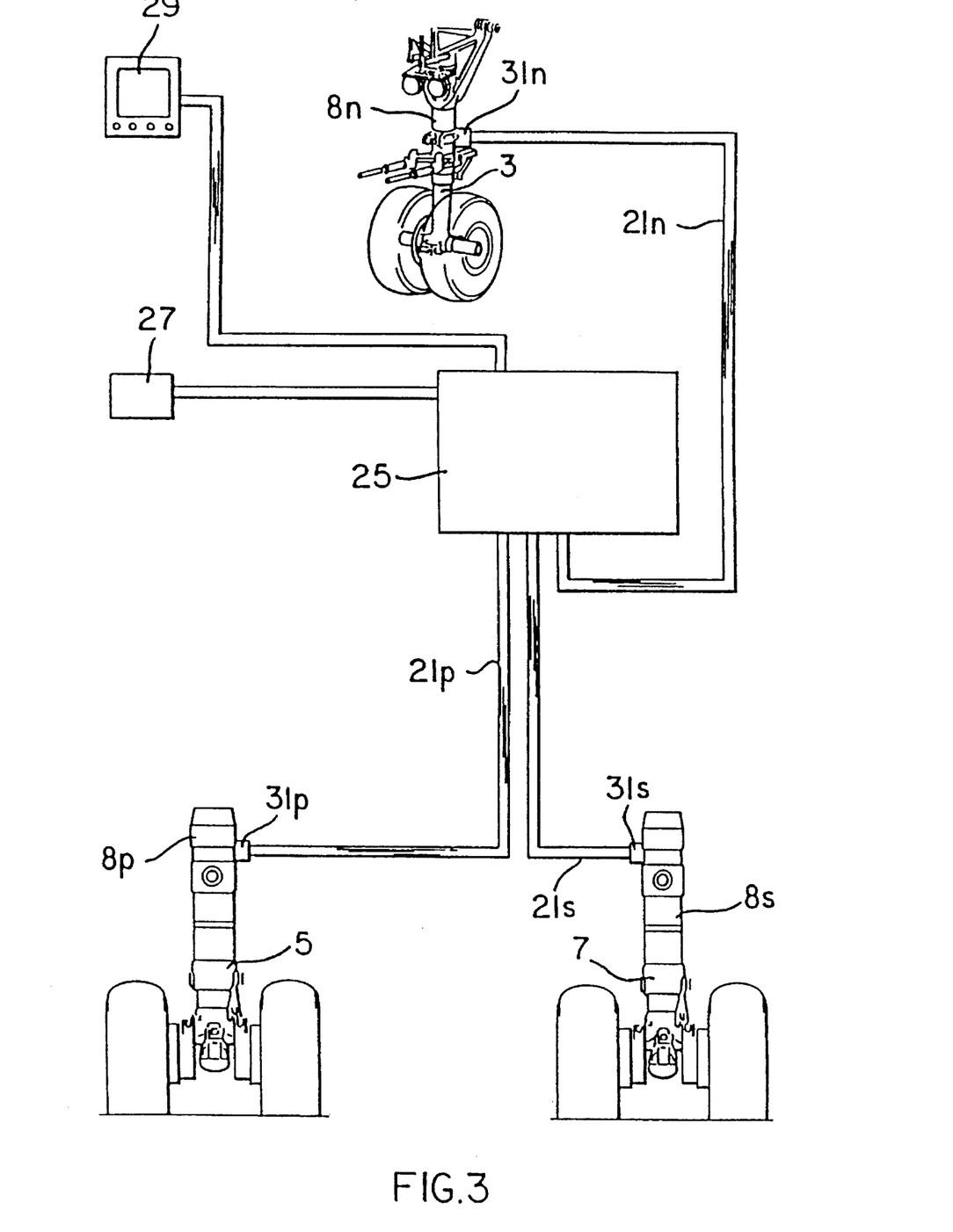
FIG. 3 is a schematic view of the invention in accordance with a preferred embodiment.

Referring now to FIG. 3, which is a schematic of the invention illustrating its connecting components, in which p represents those components of the invention dedicated to the port landing gear, n represents those components of the invention dedicated to the nose landing gear, and s represents those components of the invention dedicated to the starboard landing gear. Nose landing gear 3, along with port main landing gear 5 and starboard main landing gear 7 support the weight of the airplane on a cushion of hydraulic fluid and compressed nitrogen gas 17 (FIG. 2). Internal strut temperature and pressure signals from each of the weight supporting landing gears are transmitted by pressure and temperature transducer assemblies 31n, 31p, 31s via wiring harnesses 21n, 21p, 21s to an onboard microcomputer/controller 25. The system is powered by an existing power source 27 onboard the airplane. Various calculations and information are transmitted to an airplane cockpit display 29.

Figure 4:
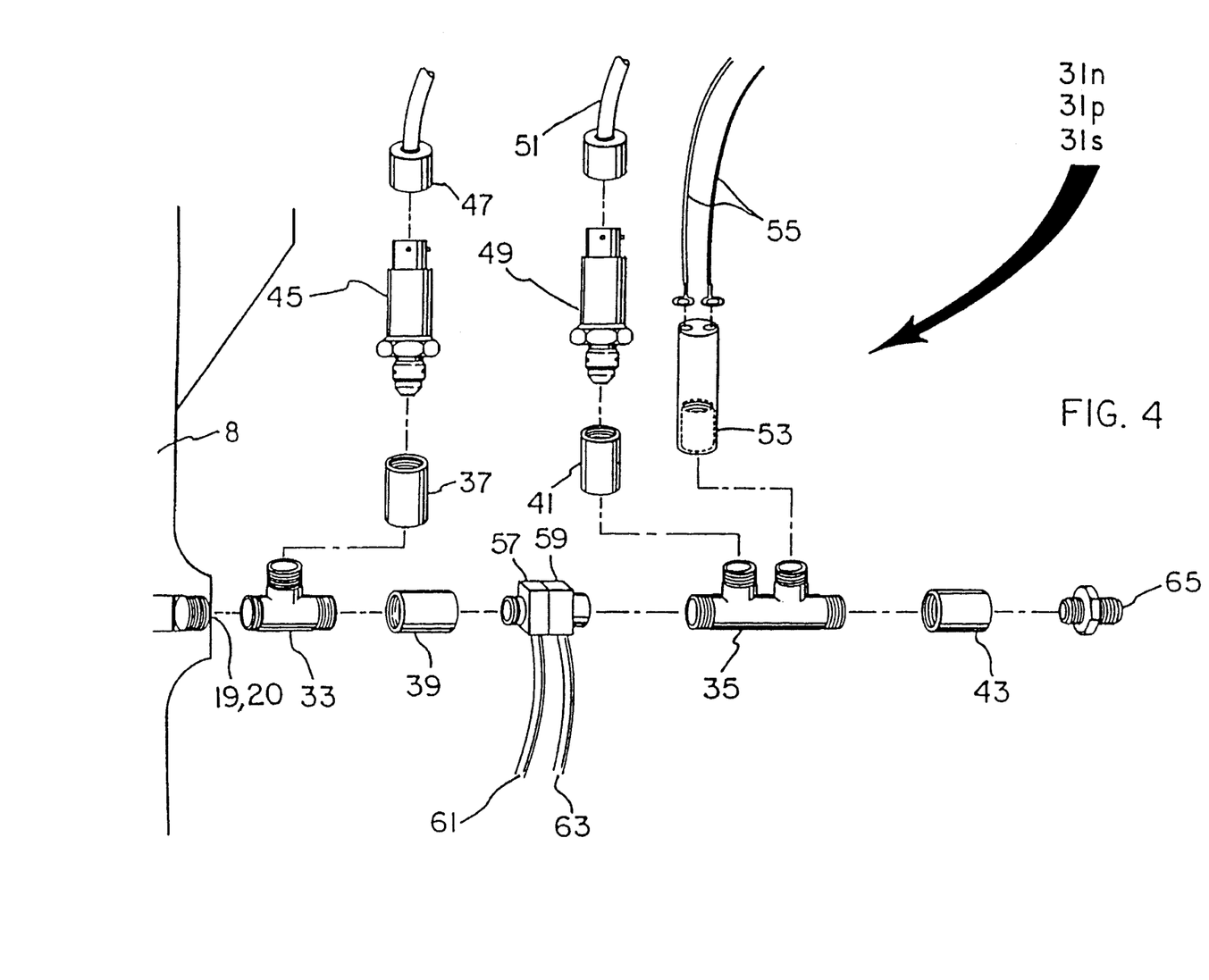
FIG. 4 is an exploded pictorial diagram of a typical commercial airline landing gear strut, with attached components of the invention.

Referring now to FIG. 4, which is a detailed view of the embodiment of transducer assemblies 31n, 31p, 31s of FIG. 3, wherein a typical commercial airliner, landing gear strut 8 incorporates a conventional pressurization valve 65 attached to each strut through a pressurization valve fitting 19 (or charging valve fitting 20, FIG.2 may be used). The pressurization valve 65 is removed to facilitate the installation of a primary T-fitting 33 on which is attached a high pressure transducer 45 connected by a threaded coupler 37. The high pressure transducer 45 is used to register any extreme pressure experienced during the initial compression of the shock strut 8 during the landing of the airplane. In-line electronic valves 57, 59 are connected to the primary T-fitting 33 by another threaded coupler 39. These valves 57, 59 will receive closing signals via wiring harnesses 61, 63 from the onboard micro-computer/controller, after sufficient pressure and temperature readings are received to make all requested calculations. This insures that the more delicate measuring equipment is protected from the extreme pressures experienced during the landing of the large airliners. A double T-fitting 35 is attached to the electronic valve 59 facilitating the connection of a pressure transmitter 49 by another threaded coupler 41. Transmitter models vary to the pressure limits on various strut assemblies. A typical −30° F. through 120° F. range temperature transducer 53 is also attached to double T-fitting 35. A fourth threaded coupler 43 is attached to double T-fitting 35 to facilitate the reinstallation of the pressurization valve 65. High pressure signals are sent to the micro-computer/controller via wiring harness 47. Sustained airplane weight pressure signals are sent to the micro-computer/controller via wiring harness 51 with corresponding temperature signals sent via wiring harness 55.

Figure 5:
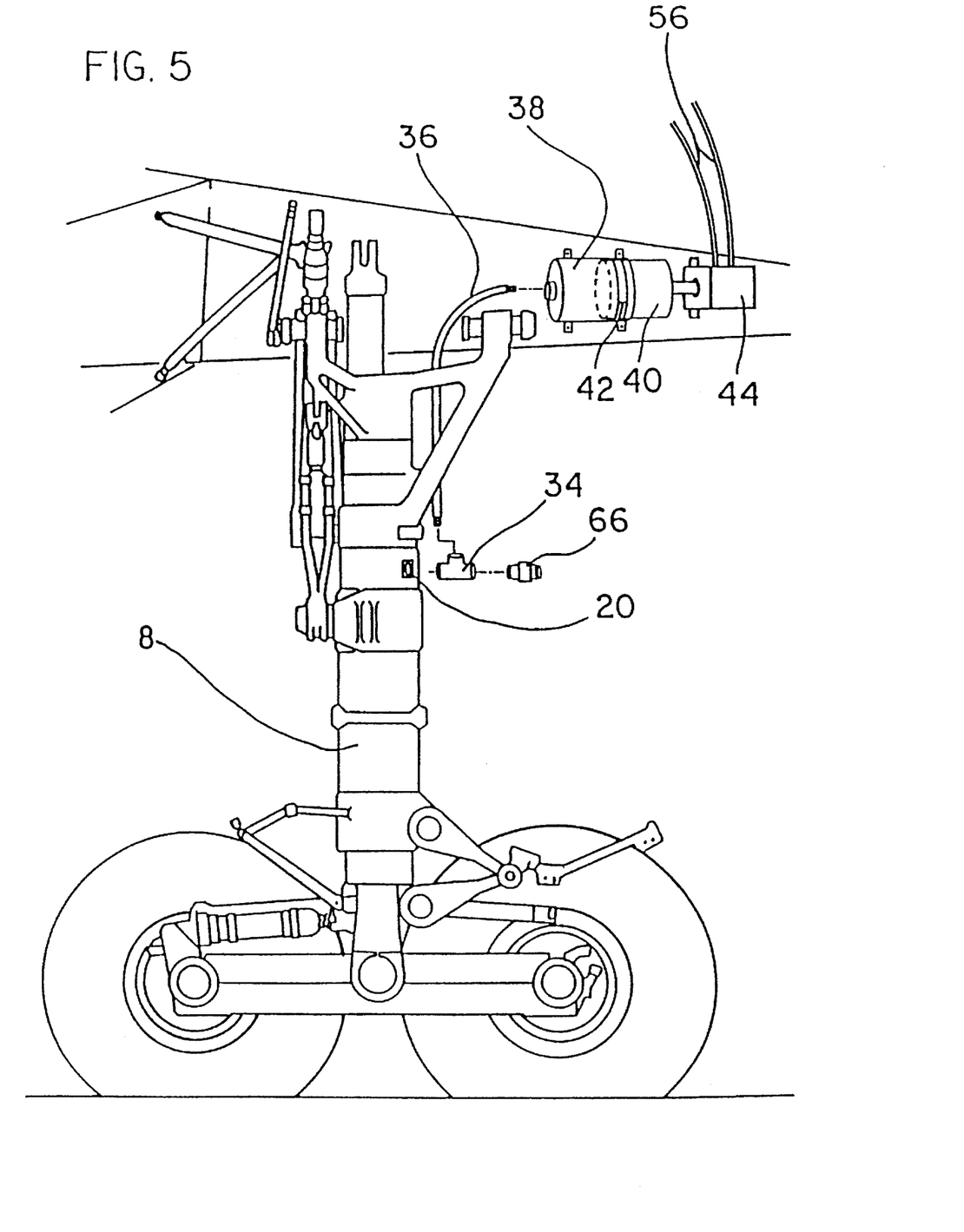
FIG. 5 is an side view of an exploded pictorial diagram of a typical commercial airline landing gear strut, shown with attached components of another embodiment of the invention.

Referring now to FIG. 5, which is a typical commercial airliner landing gear strut 8 that incorporates a conventional check valve 66 attached to each strut through a charging valve fitting 20. On each landing gear strut of the airplane the check valve 66 is removed to facilitate the installation of a T-fitting 34. A hydraulic hose 36 is attached to this T-fitting 34 and lead up the strut to a hydraulic fluid reservoir 38 mounted within the landing gear well. The hydraulic fluid reservoir pumps and withdraws hydraulic fluid by the lateral movement of the reservoir piston 40. Fluid is retained within the reservoir 38 by O-ring seals 42. The reservoir piston 40 is controlled by the reversible piston motor 44. Instructions to the reversible piston motor 44, from the micro computer/controller are transmitted via wiring harness 56. Pump and reservoir models may vary, subject to the type of aircraft involved and the space available near each landing gear strut. One version of the hydraulic fluid reservoir 38 could be a self-displacing accumulator. The electronic valves 57, 59 described in FIG. 4, can be used along with opening and closing signals from the micro computer/controller to regulate the amount of hydraulic fluid injected and withdrawn from each respective landing gear strut.

Figure 6:
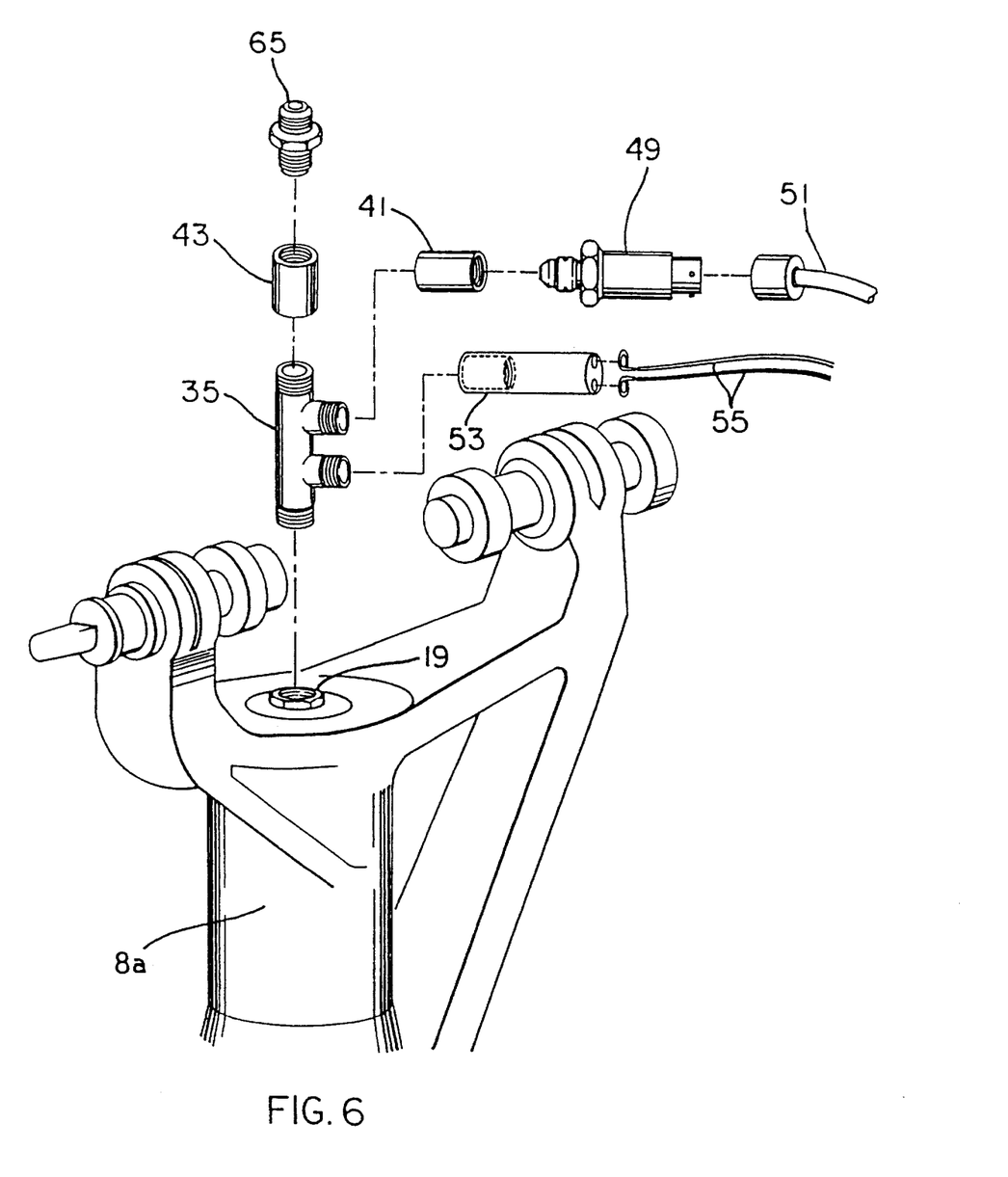
FIG. 6 is an exploded pictorial diagram of an alternate type of landing gear strut, with attached components of the invention.

Referring now to FIG. 6, which is an alternate type of landing gear strut 8a which incorporates a top pressurization valve 65 attached to each strut through a pressurization fitting 19. The pressurization valve 65 is removed to facilitate the installation of a double T-fitting 35. A pressure transmitter 49 which is connected to a threaded coupler 41, along with a typical −30° F. through 120° F. range temperature transducer 53, are attached to the double T-fitting 35. Transmitter models vary to the pressure limits on various strut assemblies. A second coupler 43 is used to facilitate the re-installation of the pressurization valve 65. Strut pressure signals relative to the weight of the airplane are sent to the microcomputer/controller via wiring harness 51 with corresponding temperature signals sent via wiring harness 55.

Figure 7:
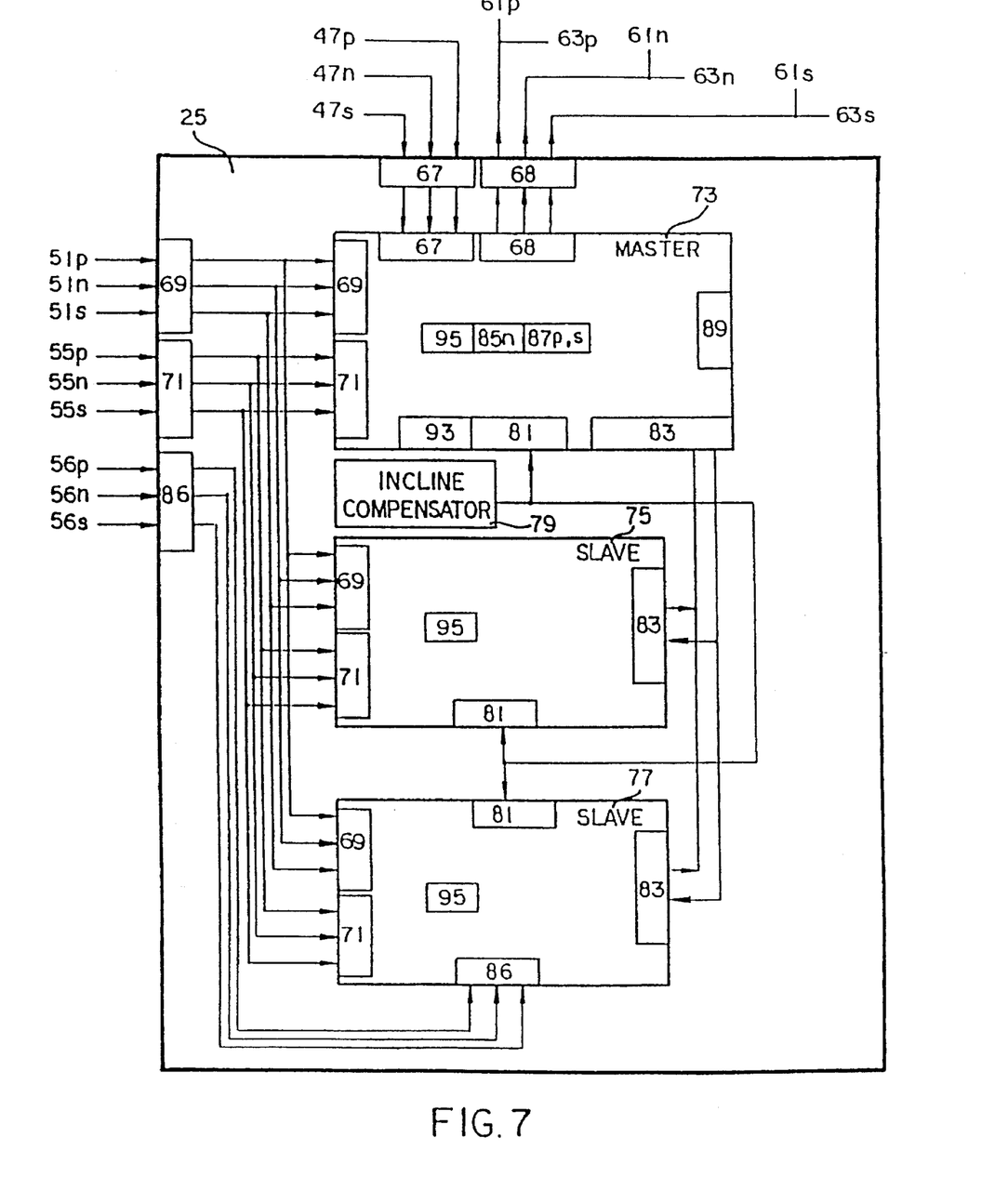
FIG. 7 is a schematic of the onboard micro-computer, with slave controllers, of the invention.

Referring now to FIG. 7, wherein p represents those components of the invention dedicated to the port landing gear, n represents those components of the invention dedicated to the nose landing gear, and s represents those components of the invention dedicated to the starboard landing gear. Temperature input signals via the nose wiring harness lead 55n, port wiring harness lead 55p and starboard wiring harness lead 55s are transmitted to the strut temperature sensor inputs 71; sustained pressure input signals via the nose wiring harness lead 51n, port wiring harness lead 51p and starboard wiring harness lead 51s are transmitted to the strut pressure sensor inputs 69, of a typical micro-computer/controller 25 system utilizing a master micro-controller 73 and slave micro-controllers 75, 77 for redundancy. In this configuration each of the micro-controllers 73, 75, 77 receive duplicate pressure and temperature information from nose 55n, 51n port 55p, 51p and starboard 55s, 51s leads. Each of the micro-controllers 73, 75, 77 also receives duplicate information from the incline compensator 79 into inputs 81. In this configuration each of the micro-controllers 73, 75, 77 perform parallel calculations. The stored look-up tables, unsprung weight compensations, calculations for total weight, center-of-gravity, % MAC, strut temperature compensation, strut drag and incline compensation, 95 are performed by each micro-controller in the system and transmitted via the master/slave communication port 83 to the master micro-controller 73. In this configuration, one of the micro-controllers 77, utilizes a mechanically generated strut drag value determination program 86. Signals are sent to each respective landing gear strut pump 44 (FIG. 5) to inject and withdraw hydraulic fluid. Those signals are sent via wiring harnesses 56n, 56p, 56s. Another configuration could allow microcomputer/controller 77 to accomplish the task of program 86 by transmitting signals via the master/slave communication port 83 to send opening and closing commands to the electronic valves 57, 59 for each respective strut, via wiring harnesses 61, 63 (FIG. 4). In this configuration, the strut reservoir 38 and piston 40 (FIG. 5) would be replaced by a typical self-displacing accumulator.

To determine the weight of an airplane, with a tricycle landing gear configuration, the following equation must be solved:

$$Wn+Wp+Ws=Wt$$

where:

Wn is the weight supported by the nose landing gear,

Wp is the weight supported by the port landing gear,

Ws is the weight supported by the starboard landing gear, and

Wt is the total weight of the airplane.

To determine the values of Wn, Wp and Ws the following equations must be solved:

$$[SAn \; x(psi \pm Dn)]+Un=Wn$$

$$[SAp \; x(psi \pm Dp)]+Up=Wp$$

$$[SAs \; x(psi+Ds)]+Us=Ws$$

where:

SAn is the load supporting Surface Area within the nose landing gear strut,

SAp is the load supporting Surface Area within the port landing gear strut,

SAs is the load supporting Surface Area within the starboard landing gear strut, Dn is the drag value for the nose landing gear strut, Dp is the drag value for the port landing gear strut, Ds is the drag value for the starboard landing gear strut, Un is the unsprung weight of the nose landing gear strut, Up is the unsprung weight of the port landing gear strut, Us is the unsprung weight of the starboard landing gear strut, and psi is the amount of pressure currently contained within each corresponding landing gear strut, measured in pounds per square inch.

(unsprung weight is that weight located below the pressurized hydraulic fluid, therefore not accounted for by the pressure measurement; it remains a constant, stored within the processor)

To insure the level of accuracy of this new invention, adjustments are made for drag within each respective landing gear strut. There are various methods to determine the value for drag on a particular landing gear strut. The most accurate means to make the drag value determination is to change the amount and direction of strut extension, while that strut is supporting a constant weight. Described below is one of such means:

pb 1. Each hydraulic fluid reservoir/pump 44 (FIG. 5) withdraws fluid from each respective landing gear strut; to force the effect of drag to be against the strut, while it is being compressed.

2. Then, the computer/controller 77 will request strut pressure measurements from the respective pressure transmitter 49 (FIG. 4). These measurements will be used as a reference point.

3. Each hydraulic fluid reservoir/pump will again withdraw fluid from each respective landing gear strut, forcing each strut to compress even further, with drag remaining a constant with the strut in a downward mode.

4. The computer/controller will again request strut pressure measurements from the respective pressure transmitter. If these measurements are identical to those stored from step #2, a verification that the strut is not in a bind will be complete. If these measurements do not match, the difference will reveal a bind in that strut and to the amount of the bind. Such a bind is typically found in the scissor-link and caused by torque or twisting of the strut piston inside the strut cylinder. Such twisting is prevented by the strut scissor-links connected the strut piston and strut cylinder.

5. Each hydraulic fluid reservoir/pump will again withdraw fluid from each respective landing gear strut, forcing each strut to compress even further, with drag remaining a constant with the strut in a downward mode.

6. The computer/controller will again request strut pressure measurements from the respective pressure transmitter. These measurements are taken and stored to insure repeatability of pressure measurements if no binding of that particular strut is evident.

7. Each hydraulic fluid reservoir/pump will at this point pump hydraulic fluid into each respective landing gear strut to force the effects of drag to reverse from those of a strut compression mode, past "zero-drag", to those of a strut in an extension mode. (drag against compression yields artificially low pressure, while drag against extension yields artificially high pressure, this being the "Load Stroke Curve").

8. The computer/controller will request pressure measurements from the respective pressure transmitter, from each landing gear strut and compare those measurements against those received and stored from step #6. Subtracting the lower (compression) pressure amount from that of the higher (extension) and dividing the remainder by a factor of 2 will identify the amount of drag currently affecting each respective landing gear strut. This solution will be determined as a drag value, measured in psi. These drag values can then be used in the determination of the aircraft weight and center of gravity.

9. Each hydraulic fluid reservoir/pump will again pump fluid to each respective landing gear strut, forcing each strut to extend even further, with drag remaining a constant with the strut in an upward mode.

10. The computer/controller will again request strut pressure measurements from the respective pressure transmitter. These measurements are taken to insure the repeatability of the pressure measurements stored from step #8.

11. With the drag value now determined for each respective strut, pressure adjustments are made by subtracting each respective drag value from the current upstroke pressure measurement of each respective strut.

If the above landing gear strut extension process were reversed, and the final strut movement were to be in the down-stroke, the respective drag value for each strut would be added to the current pressure measurement. In this method, changes in the amount of hydraulic fluid (or nitrogen gas) are made within each strut while the weight supported by each strut remains constant.

Changes in the amount of strut extension are also caused by a change in weight supported by each strut. The enclosed nitrogen gas will compress or expand with the amount of hydraulic fluid and nitrogen gas remaining constant. In this event the method of adjusting measured pressures, for a determined strut drag valve will not change.

To determine the direction the strut is moving can be accomplished by monitoring pressure changes prior to making drag value adjustments. The down-stroke (compression) of a strut yields an increase in pressure, while the up-stroke (extension) of a strut yields a decrease of the internal strut pressure.

Another method to determine the value for strut drag is to utilize the aforementioned strut extension method and repeat that procedure at various airplane weights, insuring said various weights, remain constant throughout each particular procedure. The recording of strut drag values as they relate to different weights and pressures allow that recorded information to be stored on a look-up table within the computer. A less accurate but acceptable source for this look-up table data can be generated from data taken from the airplane manufacturer's strut servicing charts. The strut servicing chart has referenced various strut extensions to corresponding pressure ranges. This chart is not generated specifically for each strut, but for all struts of this type in general.

Another method to increase the accuracy of this new invention is to compensate for the effects of temperature changes and the effects of those changes on strut drag. This method is identified in the parent application to this new invention, now U.S. Pat. No. 5,214,586.

Another method to increase the accuracy of this new invention is to reduce in size, the range of weight this new system is measuring. This can be accomplished by raising the threshold of weight to be measured to that of the empty weight of the airplane. In the calibration process for the preferred embodiment of this new invention, after it has been installed on a typical commercial airliner, said airplane is rolled on to a set of three calibration scales; currently used by the airline industry, when they periodically check each airplane for weight changes. The empty weight of the airplane is recorded by the sum and totaling of the weights registered by the three calibration scales. That recorded empty weight is stored within the computer as weights supported by each corresponding landing gear strut. The weight supported by each strut is identified and matched to the corresponding strut pressure currently measured for that strut. This data is stored on a look-up table within the computer. Subsequent weight determinations by this new invention will use the airplane's empty weight as a starting point, with additional loaded weight calculated and then added to this starting weight to generate a total airplane weight. For example, the pressure transducers 49 are calibrated to measure only that pressure relating to weight in excess of the aircraft's empty weight.

Another method to increase the accuracy of this new invention is to again raise the afore mentioned threshold of weight or starting weight to an even higher amount. As additional weight is loaded onto the airplane the weights recorded will increase as will the pressure measurements taken for each corresponding strut. These correlated weights to pressure measurements can be recorded and stored on a look-up table within the computer. This higher threshold or starting weight can further reduce in size, the range of weight this new system is measuring.

Utilizing the aforementioned methods of determining strut drag, it is realized that strut drag increases as strut pressure increases. Therefore, another method to increase the accuracy of this new invention is to use the aforementioned procedures to generate a strut pressure to strut drag look-up table to be stored within the computer.

An airplane's center-of-gravity can be determined by comparing the weight supported by the nose landing gear to the weight supported by the combined port and starboard main landing gears. As the weight supported by the nose landing gear changes in relation to the weight supported by the combined main landing gear; the center-of-gravity will relocate proportionally to those changes. The varying location of an airplane's center of gravity is described as a percentage of the Mean Aerodynamic Chord (% MAC).

To determine % MAC on an airplane the following equation must be solved:

$$\frac{y}{MAC} = \frac{L}{MAC}\left(1 - \frac{l}{L}\right)\frac{L}{MAC}\left(\frac{Wn}{Wt}\right)$$

where:

L is the distance between the nose landing gear and the port and starboard landing gears, l is the distance of the nose landing gear from the leading edge of the Mean Aerodynamic Chord, MAC is the length of the Mean Aerodynamic Chord, % MAC is $$\frac{y}{MAC} \times 100$$

Wt is the total weight of the airplane,

Wn is the weight supported by the nose landing gear and y is the distance between the leading edge of the Mean Aerodynamic Chord and the center of gravity of the airplane.

Irregardless of the loading configuration of a particular airplane L, l and MAC are known constants; Wt and Wn are values provided through the solution to the equation to determine the total weight of the airplane.

When these calculations are complete, and the master micro-controller 73 has received the parallel calculation results from the slave micro-controllers 75, 77, a confidence calculation 89 is performed by the master micro-controller 73.

In the preferred embodiment, the determination of the confidence factor will call for a standard deviation to be determined between all of the micro-controller 73,75,77 solutions to the equations for gross weight and % MAC. On a scale from 10 to 100, a 1% standard deviation is equal to a confidence factor of 10, and a 0% standard deviation is equal to a confidence factor of 100.

The results of the calculations for weight, % MAC and confidence are transmitted to the cockpit display 29 (FIG. 3). After the master micro-controller 73 has made all transmissions to the cockpit display 29 (FIG. 3), valve closing signals are sent through outputs 68, via wiring harnesses 61, 63, to their corresponding electronic valves 57, 59 (FIG.4).

A "Hard Landing" can be determined during the initial impact of the airplane landing. The extreme strut pressure signals generated from transducers 45 (FIG. 4) are transmitted to pressure sensor inputs 67 via wiring harnesses 47n, 47p, 47s. These pressures are compared to preprogrammed limits 85n, 87p,s which are provided by the airplane and landing gear strut manufacturers, then stored within the master micro-controller 73. If any of these preprogrammed limits 85n, 87p,s are exceeded, a signal representing the corresponding landing gear will be transmitted to the cockpit display 29 (FIG. 3), advising the pilot that a hard landing has possibly effected a particular landing gear. In the preferred embodiment, an optional security device such as a maintenance passkey will be required to remove the "Hard Landing" indication from the cockpit display 29 (FIG. 3).

An additional master computer/controller program 93, which indicates wing-lift distorting ice accumulations as will as changes in aircraft weight due to those ice accumulations, is available as an option. As a reference, the weight of a cubic foot of ice is stored into the permanent memory of this program (this weight equals 12 square feet of ice 1 inch thick, or 48 square feet of ice ¼ inch thick, etc.). The total exterior surface square footage, of that particular aircraft, on which ice can accumulate is determined and also stored in the permanent memory of this program. As an alternative, tables may be supplied by the aircraft manufacturer relating ice thickness as a function of weight gains on that particular aircraft. Once the aircraft loading has been completed and all deicing procedures have been implemented, the pilot can then save within this program, the aircraft's current "clean loaded weight". If take-off delays force the aircraft to wait and allow the re-accumulation of ice deposits on exterior surface areas, those accumulations can be indicated in real time as they relate to added weight shown on this system. The pilot may recall the "clean loaded weight" and compare it to existing weight at any time prior to take-off.

At the end of each day, when the airplane is retired from service and onboard instrumentation is shut down, this system preforms one final calculation to determine weight and center of gravity. The following day as the airplane is brought back into service, and onboard instrumentation is turned back on, this system again performs the calculations to determine weight and center of gravity; then compares these new calculations to those of the previous day. A match will provide a self-check to the entire system.

In a practical application of the preferred embodiment of this new invention, the micro-computer/controller 25 will perform the following tasks:

a. Take pressure and temperature measurements from each landing gear strut.

b. Refer to look-up tables for each respective strut, stored within the computer memory to determine drag values as they relate to current signals received from the pressure transducers and the temperature transducers attached to each respective landing gear strut and or use other of the various methods described to determine respective strut drag values.

c. Make the appropriate pressure adjustments and weight compensations for respective drag values and weight determinations.

d. Compensate for aircraft inclination.

e. Calculate the aircraft's weight and center-of-gravity.

f. Display the weight and center-of-gravity calculations.

Any single method or a combination of any or all methods described to adjust pressure measurements to compensate for strut drag may be used to obtain the accuracy the user of this new invention requires.

Although an exemplary embodiment of the invention has been disclosed and discussed, it will be understood that other applications of the invention are possible and that the embodiment disclosed may be subject to various changes, modifications, and substitutions without necessarily departing from the spirit of the invention.

What is claimed is:

1. An apparatus for determining the weight of an aircraft, said aircraft comprising plural pressurized landing gear struts, said landing gear struts experiencing friction/drag, such as friction caused by landing gear strut internal O-ring seals, said friction/drag distorting internal strut pressures as they relate to weight supported by said landing gear struts, said apparatus comprising:

a) a pressure sensor for each said landing gear strut, said respective pressure sensor being adapted to couple to said respective landing gear strut so as to measure pressure inside said respective landing gear strut, b) processor means for determining said aircraft weight, said processor means being adapted to couple to said pressure sensors, said processor means determining said aircraft weight using pressure measurements from said pressure sensors wherein compensations for said friction/drag to said landing gear strut pressure measurements are used in determining weights supported by said respective landing gear struts.

2. The apparatus of claim 1, further comprising look-up table means incorporated into said processor means, said look-up table means being a correlation of said respective strut pressure as related to said pressure distorting strut friction/drag, wherein said processor means uses said look-up table means to determine said aircraft weight, from said strut pressures distorted by said strut friction/drag.

3. The apparatus of claim 1, further comprising a means for providing a determination of said respective strut friction/drag.

4. The apparatus of claim 3, wherein said means for providing a determination of said respective strut friction/drag is adapted to couple to said aircraft.

5. The apparatus of claim 4, wherein said means for providing a determination of said respective strut friction/drag comprises a reservoir.

6. The apparatus of claim 4, wherein said means for providing a determination of said respective strut friction/drag comprises a pump.

7. The apparatus of claim 4, wherein each said landing gear strut comprises fluid therein, the apparatus farther comprising a valve means for each landing gear strut, each of said valve means being adapted to couple to said respective landing gear strut, each of said valve means being operable to selectively open and close, wherein said valve means regulates the fluid injected and withdrawn from said respective landing gear strut.

8. The apparatus of claim 1, further comprising a temperature sensor for each of said landing gear struts, said temperature sensors being adapted to couple to said respective landing gear struts, so as to measure the temperature of said respective landing gear strut, wherein said processor means further compensates said internal strut pressure and said determined weights supported by said respective landing gear struts, using said measured temperatures.

9. The apparatus of claim 1, further comprising plural of said pressure sensors for said respective landing gear strut and plural of said processor means to provide redundancy.

10. The apparatus of claim 1, further comprising a display means for providing said determined aircraft weight to a human or other processor means.

11. A method of determining the weight of an aircraft, said aircraft being supported by plural pressurized landing gear struts, each of said landing gear struts experiencing friction/drag, such as friction caused by landing gear strut internal O-ring seals, said friction/drag distorting internal strut pressures as they relate to weights supported by said landing gear struts, said method comprising the steps of:

a) determining the amount of pressure within said respective landing gear struts, b) compensating said respective pressure determinations of said respective landing gear struts, for distortions caused by said respective strut friction/drag, c) determining the weight supported by each of said landing gear struts from said respective compensated pressure determinations. d) determining the weight of said aircraft from said respective landing gear strut weight determinations.

12. The method of claim 11, further comprising the step of determining the temperatures of said respective landing gear struts, and compensating said respective measured pressures for distortions caused by said strut friction/drag, for changes in said respective measured temperature.

13. The method of claim 11, further comprising the step of determining the center-of-gravity of said aircraft from said respective determined weights supported by said respective landing gear struts.

14. The method of claim 13, further comprising the step of determining the center-of-gravity of said aircraft in terms of Percent Mean Aerodynamic Chord (% MAC).

15. The method of claim 13, further comprising the step of determining the amount of said aircraft inclination, and compensating said determination of said center-of-gravity for said inclination.

16. The method of claim 11, further comprising the step of performing a self check of said weight determinations.

17. The method of claim 11, further comprising the step of determining the friction/drag of said respective landing gear struts.

18. The method of claim 17, further comprising the step of storing said pressure and friction/drag determinations so as to create a history of pressure and friction/drag determinations for each respective landing gear strut, and using said respective histories to evaluate the performance of each respective strut.

19. The method of claim 11, further comprising the steps of a) determining said aircraft weight with plural processor means, such that each respective processor means determines the weight of said aircraft, b) comparing said determined aircraft weights of each respective processor means, c) determining a confidence factor which indicates the reliability of said aircraft weight determinations.

20. The method of claim 11, further comprising the steps of:

a) measuring the amount of pressure within at least one of said landing gear struts, during a landing of said aircraft, b) comparing said measured pressure to a pre-determined pressure, wherein if said measured pressure exceeds said pre-determined pressure, then said aircraft has experienced a hard landing.

c) if said aircraft has experienced a hard landing, then providing an indication of said hard landing.

21. The method of claim 20, further comprising the step of preventing said indication of said hard landing from being deleted without an appropriate passkey.

22. The method of claim 11, further comprising the steps of determining the friction/drag on said respective landing gear struts by changing the amount of strut extension, with said aircraft remaining at a constant weight, and determining the internal strut pressure as compared to previous strut pressure, said previous strut pressure being recorded prior to the changing of said strut extension.

23. The method of claim 11, wherein the step of (11-d), further comprising the steps of determining a first weight of said aircraft, subsequent to standard de-icing procedures, said method further comprising the steps of:

a) determining a second weight of said aircraft, subsequent to a passage of time, b) comparing said first aircraft weight determination to said second aircraft weight determination, the difference between the first and second aircraft weight determinations being the weight of ice build-up on said aircraft.

c) determining the thickness of said ice build-up using said comparison of said first and second aircraft weight determinations.

24. The method of claim 11, wherein said step of compensating said respective pressure determinations of said respective landing gear struts for distortions caused by said respective strut friction/drag further comprises the step of adjusting said respective pressure determinations of said respective landing gear struts for respective strut friction/drag.

25. The method of claim 11, wherein said step of compensating said respective pressure determinations of said respective landing gear struts for distortions caused by said respective strut friction/drag further comprises the step of adjusting said respective pressure determinations of said respective landing gear struts for pre-determined respective strut friction/drag.

26. The method of claim 11, further comprising the steps of determining the amount of said pressure distorting friction/drag within the respective landing gear struts by injecting and withdrawing fluid into and from said respective landing gear struts, with said aircraft remaining at a constant weight, while monitoring the pressure within said landing gear struts.

27. The method of claim 11, further comprising the steps of determining the amount of said pressure distorting friction/drag within the respective landing gear struts by changing the amount of weight supported by each of said landing gear struts, while monitoring the pressure within each of said landing gear struts.

28. A method of determining the weight of an aircraft, said aircraft being supported by plural pressurized landing gear struts, each of said landing gear struts experiencing friction/drag, such as friction caused by landing gear strut internal O-ring seals, said friction/drag distorting internal strut pressures as they relate to weights supported by said landing gear struts, said method comprising the steps of:

a) moving said respective landing gear strut seals to compensate for distortions caused by said respective strut friction/drag, b) determining the amount of pressure within said respective landing gear struts, c) determining the weight supported by each of said landing gear struts from said respective pressure determinations, d) determining the weight of said aircraft from said respective landing gear strut weight determinations.

29. The method of claim 28, wherein the step of moving said respective landing gear strut seals further comprises the steps of injecting and withdrawing fluid into and from said respective landing gear struts.

\* \* \* \* \*